US005316743A

United States Patent [19]

LeBlanc et al.

[11] Patent Number: 5,316,743

[45] Date of Patent: May 31, 1994

[54] DIESEL FUEL CRACKING UNIT

[76] Inventors: Ralph W. LeBlanc, 7910 Windward Ct., New Orleans, La. 70128; Robert M. Bingham, 2212 Albert St., #220, Jefferson, La. 70121

[21] Appl. No.: 951,783

[22] Filed: Sep. 28, 1992

[51] Int. Cl.[5] .............................................. B01D 11/04

[52] U.S. Cl. .................................... 422/256; 422/255; 208/179; 208/184; 208/187; 202/83; 196/133; 196/106

[58] Field of Search ....................... 208/179, 184, 187; 196/117, 46, 133, 106; 422/255, 256; 202/235, 83, 174

[56] References Cited

U.S. PATENT DOCUMENTS 97,058 11/1869 DeLime ................................ 202/83
412,407 10/1889 Napoles ................................ 202/83
1,464,918 9/1919 Andrews ............................ 261/113
1,828,428 2/1928 Moreton ............................. 208/179
3,625,881 12/1971 Chambers .......................... 208/179
3,953,298 4/1976 Hogan ................................ 196/133
4,033,859 7/1977 Womble ............................. 210/180
4,129,501 12/1978 Haynes ............................. 210/23 R
4,512,878 0/1989 McKibben ......................... 208/179
4,606,809 8/1986 Garg .................................... 208/59
4,797,198 1/1989 Wetzel ............................... 208/181
4,983,259 1/1991 Duncan et al. ..................... 192/106

*Primary Examiner*—Robert J. Warden
*Assistant Examiner*—Hien Tran
*Attorney, Agent, or Firm*—David L. Ray

[57] ABSTRACT

A portable refinery including a refining vessel, a heater for providing heat to the refining vessel, dewatering devices, and a storage tank mounted on a skid which can be quickly and easily transported to a reservoir of petroleum or waste petroleum products to refine the petroleum or waste petroleum into diesel grade fuel at the reservoir.

4 Claims, 3 Drawing Sheets

DIESEL FUEL CRACKING UNIT

BACKGROUND OF THE INVENTION

1. Field of the Invention

The invention relates to refining petroleum. More particularly, the present invention relates to converting crude oil and/or waste oil into a useable fuel for diesel engines.

2. Description of the Related Art

The need to conserve natural resources is now universally recognized. In particular, petroleum conservation has become widespread and efforts to control air pollution resulting from the combustion of petroleum products has increased. Waste petroleum products are being re-cycled in an effort to conserve petroleum. However, some petroleum deposits are located so far from petroleum refineries that the cost of transporting the petroleum is a significant factor compared to the cost of the petroleum at the production site or oil field storage tank.

Petroleum refining devices are known in the art, as are devices for refining waste oil such as waste lubricating oils. Exemplary of such devices are the following U.S. Patents:

U.S. Pat. No. 4,797,198 discloses a process for the working up of salvage oil, in which the salvage oil is subjected to an extraction under supercritical conditions. The halogen compounds contained in the produced extract are removed by catalytic hydrogenation. The extraction residue is eliminated by deposition or thermal treatment (gasification). In the case of a thermal treatment of the extraction residue, other residues can be simultaneously converted, so that the process is performed without yield of environmentally burdensome residues or by-products. Ethane in particular and/or propane is employed as solvent for the supercritical extraction.

U.S. Pat. No. 4,606,809 discloses a hydroconversion of heavy oils in which high yields of desired distillate oil are obtained by subjecting heavy oil to catalytic conversion with hydrogen at superatomospheric pressure in a temperature staged process, wherein the oil catalyst slurry is subjected in the initial stage to a temperature in the range of 780°-825° F. (415°-440° C.) and in a subsequent stage to a temperature which is at least 20° F. higher than that employed in the previous stage, preferably in the range of 800°-860° F. (425°-460° C.).

U.S. Pat. 4,512,878 discloses used oil re-refining, especially used lubricating oils which are normally considered waste and are discarded or burned, in which the used oils reclaimed for reuse by a re-refining procedure involving the steps of: (a) heat soaking the used oil; (b) distilling the heat soaked oil; (c) passing the distillate through a guard bed of activated material; (d) hydrotreating the guard bed treated distillate under standard hydrotreating conditions.

If the used oil to be re-refined contains a quantity of water and/or fuel fraction which the practitioner considers sufficiently large to be detrimental, the used oil may be subjected to a dewatering/defueling step prior to being heat soaked.

U.S. Pat. No. 4,033,859 discloses thermal treatment of used petroleum oils, such as automotive crankcase oil drainings from internal combustion engines, in which the oils are pretreated by heating to above about 400°-800° F., and preferably between 600°-750° F., while an essentially liquid phase system is maintained at a pressure of between 500-3500 p.s.i.g., preferably between 2000-3500 p.s.i.g., for between 15-60 minutes, the contact time being even shorter at higher temperatures. A sludge which contains contaminants, such as insoluble degradation products, metallic compounds, and water, is separated preferably by centrifugation, leaving a substantially ashless oil ready for additional refinement to a high quality lubricating oil, or it may be used, per se, as a fuel oil.

U.S. Pat. No. 3,625,881 discloses a crank case oil refining that are reclaimed from used crankcase oils obtained from gasoline or diesel internal combustion engines, or mixtures thereof, by flash vaporization of substantially all the water content of the used oil at noncoking temperatures; admixing the dried oil with a hydrocarbon oil having an ASTM boiling range of about 150°-250° F. and a 50 percent point of about 200° F., to precipitate carbonaceous solids; the admixing taking place in the presence of a concentrated aqueous alkali metal hydroxide in a minor amount and at a moderately elevated temperature; centrifugally separating the solid precipitate from the treated liquid oil admixture; subjecting the separated treated liquid oil admixture to a first fractional distillation under conditions which will preclude coking or degradation of the lubricating components from a water-containing overhead fraction; and subjecting the bottoms fraction to a second fractional distillation to obtain lubricating oil cuts and a usable bottoms product. The water from the flash vaporization may be combined with the watercontaining overhead fraction for removal of undesirable water-soluble components.

U.S. Pat. No. 1,828,428 discloses a method of reclaiming contaminated lubricating oils including providing a fixed bed of calcareous substance possessing the characteristic of attracting to it mechanical impurities suspended in the oil, and causing the oil to filter through the bed.

U.S. Pat. No. 1,464,918 discloses a tower apparatus for treating hydrocarbons including a liquid elevating conduit having its lower end disposed in a body of liquid in the tower, a device for forcing the vapor to be treated into the conduit, near its lower end, and a member in the tower on which the liquid elevated through the conduit falls and which causes the liquid to fall in a finely divided state and thereby be brought into intimate contact with the vapors in the tower.

SUMMARY OF THE INVENTION

In accordance with the present invention there is provided a portable refinery which can be quickly and easily transported to a reservoir of petroleum or waste petroleum products to refine the petroleum or waste petroleum into diesel grade fuel at the reservoir.

The present invention has the advantage of providing a transportable system that will efficiently produce diesel fuel from petroleum and waste petroleum products such as motor oil and the like.

Another advantage of the invention is that the invention is relatively low in cost when compared to a stationary refinery.

An additional advantage of the invention is that it requires minimum maintenance and few personnel to operate.

Another advantage of the invention is that it may be easily transported to countries having no large refineries and to other remote areas to provide diesel fuel from reservoirs of petroleum or waste petroleum products in such remote areas.

BRIEF DESCRIPTION OF THE PREFERRED EMBODIMENTS

Figure 1A:
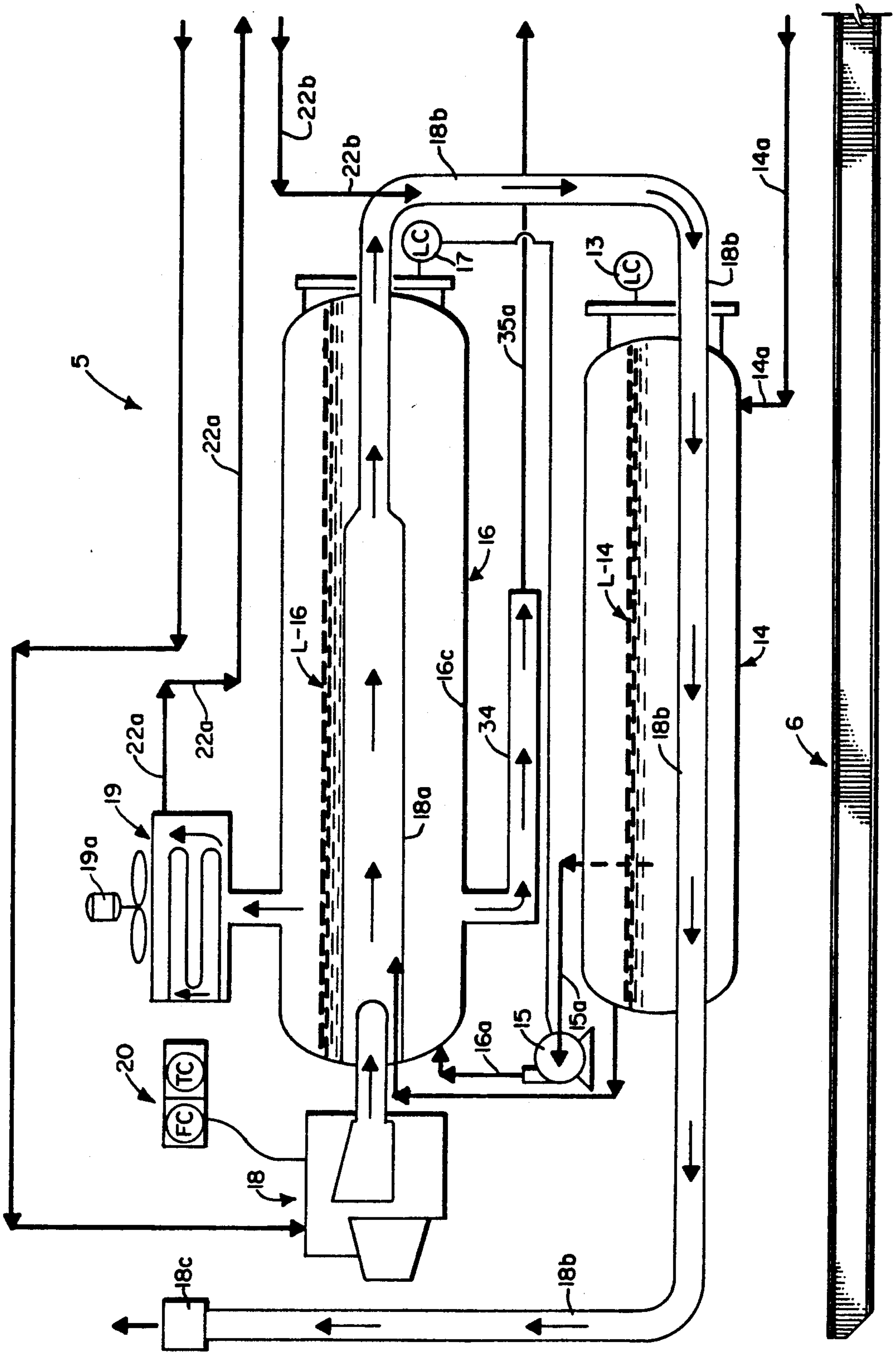
FIG. 1A is the first of two schematic drawings of the portable refinery of the present invention which is continued on FIG. 1B.
Figure 1B:
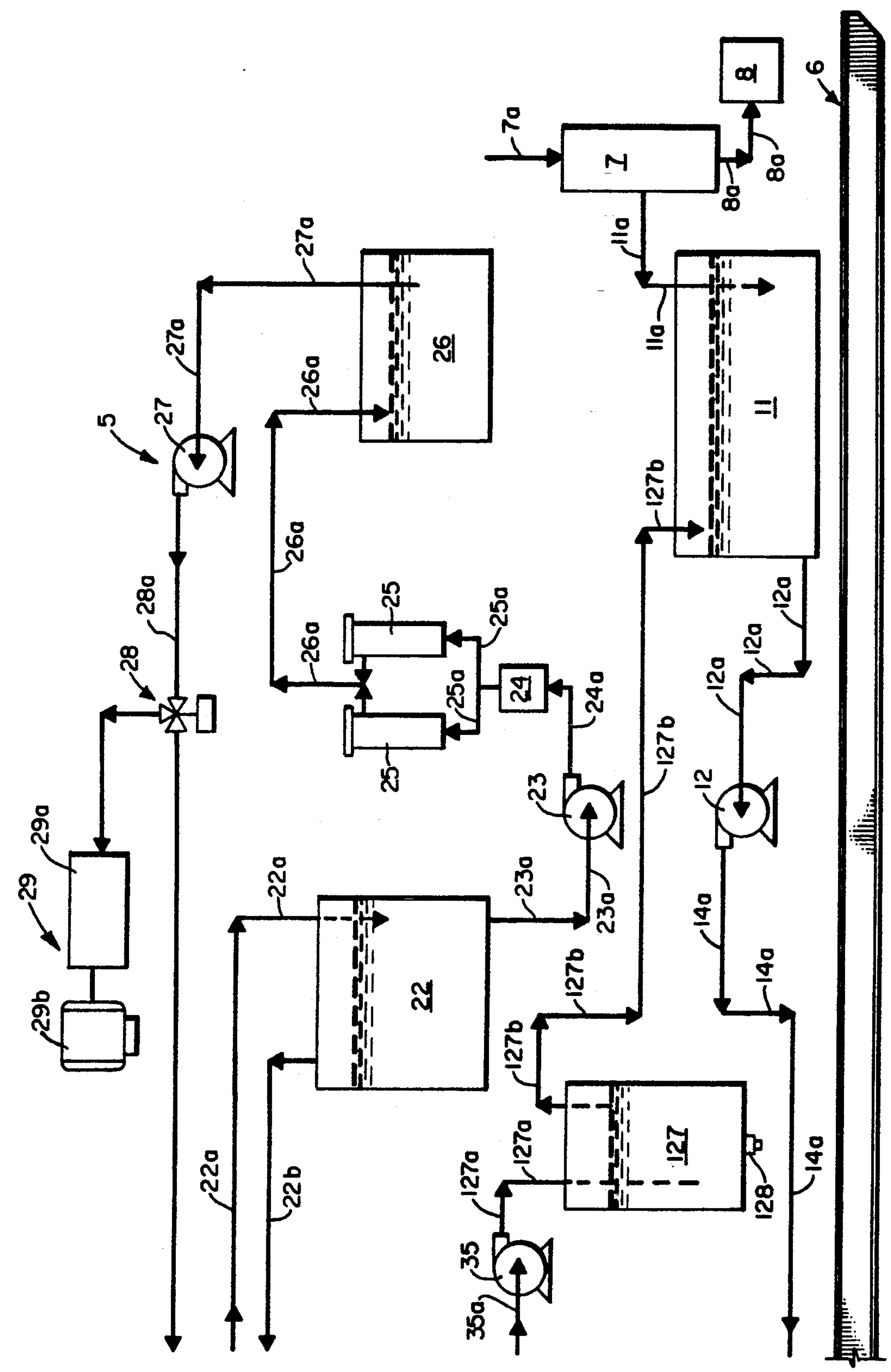
FIG. 1B is the second of two schematic drawings of the portable refinery of the present invention which is continued from FIG. 1A.

Referring now to the drawings, in FIG. 1A and 1B the portable refinery of the invention is generally indicated by the numeral 5. In FIGS. 1A and 1B, refinery 5 is schematically indicated above a skid generally indicated by the numeral 6 to indicate portable refinery 5 is mounted on skid 6. Skid 6 is portable and is preferably made of steel or other metal sufficiently strong to support portable refinery 6.

Waste oil or petroleum from a source of waste oil or petroleum such as a crude oil or waste oil storage tank(-not shown) is introduced to oil/water separator 7 mounted on skid 6 through pipe 7*a* in the direction indicated by the arrow. Oil/water separator 7 extracts as much of any water present in the petroleum or waste oil and impurities that are usually associated with water and oily products emulsified in the water. Oil/water separator 7 is preferably not mounted on skid 6 to make the portable refinery more compact, although oil/water separator 7 may be mounted on skid 6 if desired.

Water, and impurities contained therein, flow to waste disposal unit 8 through pipe 8*a* in the direction indicated by the arrows. Waste disposal unit 8 may be a reservoir for storage of the waste water, or waste disposal unit 8 may be a conventional water treatment or filtering apparatus for purifying the water received thereby sufficiently to release to the environment. Waste disposal unit 8 is preferably is not mounted on skid 6 to make the portable refinery more compact, although waste disposal unit 8 may be mounted on skid 6 if desired.

Petroleum or waste oil flows from oil/water separator 7 to petroleum or waste oil reservoir 11 through pipe 11*a* in the direction indicated by the arrows. Reservoir 11 is preferably is not mounted on skid 6 to make the portable refinery more compact. Reservoir 11 may vary in size from a few hundred gallons to several thousand gallons depending upon the source of supply and location. However, if desired, oil/water separator 7 may be mounted on skid 6.

Waste oil or petroleum is pumped from reservoir 11 by pump 12 through pipe 12*a* in the direction indicated by the arrows. Pump 12 pumps waste oil or petroleum to the pre-heater vessel generally indicated by the numeral 14 through pipe 14*a*, the operation of pump 12 being controlled by conventional control 13 connected to vessel 14 which operates pump 12 to maintain a pre-set level L-14 of liquid in pre-heater vessel 14.

Pre-heated petroleum or waste oil is then pumped from pre-heater vessel 14 by pump 15 through pipe 15*a* in the direction indicated by the arrows. Pump 15 pumps waste oil or petroleum to the refining vessel generally indicated by the numeral 16 through pipe 16*a*, the operation of pump 15 being controlled by conventional control 17 which operates pump 15 to maintain a pre-set level L-16 of liquid in refining vessel 16. Refining vessel 16 may be a distillation tower or cracking unit well known in the art.

The waste oil or petroleum in refining vessel 16 is heated to the cracking temperature of diesel fuel which is about 630 degrees Fahrenheit. Heat is supplied to the refining vessel 16 by the heater generally indicated by the numeral 18 in FIG. 1A. Heater 18 forces heated air in the direction indicated by the arrows through pipe of flue 18*a* in refining vessel 16 to heat the liquids therein to crack or distill the liquids into diesel fuel. Heat is transferred by conduction to the waste oil or petroleum being processed in the refining vessel 16 and is carried out of the refining vessel by exhaust pipe 18*b* in the direction indicated by the arrows therein. Exhaust pipe 18*b* passes through pre-heater 14 to pre-heat liquids therein and is then exhausted to the atmosphere through exhaust muffler 18*c*. Preferably, heater 18 is fueled by diesel fuel.

During the distillation or cracking process occurring in refining vessel 16, some of the waste oil or petroleum in refining vessel 16 is vaporized or converted to the gaseous state. Gases from refining vessel 16 may have a variety of impurities, such as water, which flow through condenser 19 in the direction indicated by the arrows in condenser 19 along with gaseous hydrocarbons from the waste oil or petroleum. Condenser 19 condenses water vapor and gaseous hydrocarbons into liquid water and diesel fuel which gravity flow or drain through pipe 22*a* to diesel fuel storage tank 22 where refined diesel fuel is stored for sale, re-use or transport to storage sites or reservoirs. Condenser 19 is a conventional condenser cooled with air blown by fan 19*a* that assists in dissipating heat transferred to the waste oil or petroleum in refining vessel 16.

The rate of refining and flow through the system is controlled by the conventional control 20 which controls the operation of the heater 18 to turn the heater on and off, and control the temperature thereof. Pumps 12 and 15 control the liquid level L-14 in pre-heater vessel 14 and L-16 in refining vessel 16 to pre-set levels. Therefore, when heater 18 is operated to convert some of the waste oil or petroleum in refining vessel 16 to the gaseous state, gases leave refining vessel 16 thereby lowering the liquid level L-16 in refining vessel 16, causing control 17 to actuate pump 15 to return level L-16 to the pre-set level. The refining process thus begins and continues until heater 18 is turned off or lowered until no liquids in refining vessel 16 are converted to gases and liquid level L-16 remains unchanged.

Liquids in bottom of the diesel fuel storage tank 22 are pumped through pipes 23*a* by pump 23 to preliminary fuel/water separator 24 through line 24*a* in the direction indicated by the arrows, and on through pipes 25*a*—25*a* to filters 25—25. Any water vapor accumulating in the top of diesel fuel storage tank 22 is vented through pipe 22*b* to exhaust pipe 18*b* in the direction indicated by the arrows. Filters 25—25 are preferably coalescer/depth filters which further remove water before liquid flows through pipes 26*a* into diesel reservoir tank 26. Diesel fuel, such as #2 diesel fuel, refined in the portable refinery 5 of the invention and stored in tank 26 may be used within the portable refinery 5 or stored for use elsewhere, or sale.

Heater 18 will require a flow of diesel fuel to burn to generate heat supplied to refining vessel 16 and preheater 14. Pump 27 pumps diesel fuel from tank 26 through pipes 27*a* to the valve generally indicated by the numeral 28 through pipe 28*a*. Diesel fuel then flows through valve 28 to heater 18 through pipes 18*a* in the direction indicated by the arrows.

A secondary flow path for the waste oil or petroleum being processed originates at the refining vessel 16. The impurities such as water that are heavier than oil and not converted to gas in refining vessel 16 settle in the bottom 16*c* of refining vessel 16 and collect in accumulator tube 34. The impurities are pumped from accumulator tube 34 in the direction indicated by the arrows through pipe 35*a* to pump 35 where they are pumped into oil settling tank 127 through pipes 127*a*. Oil settling tank 127 may have a drain 128 through which impurities may be selectively removed as desired and needed to periodically clean tank 127. Tank 127 is located at a height to permit siphoning liquids less dense than water and other impurities into reservoir 11 through pipe 127*b*.

It is preferred that portable refinery 5 includes an electrical alternating current generating system generally indicated by the numeral 29 to provide electrical energy to operate the controls and other electrical equipment such as lighting of the portable refinery 5. Generating system 29 includes an internal combustion diesel fueled engine 29*a* which drives alternating current generator 29*b*.

Figure 2:
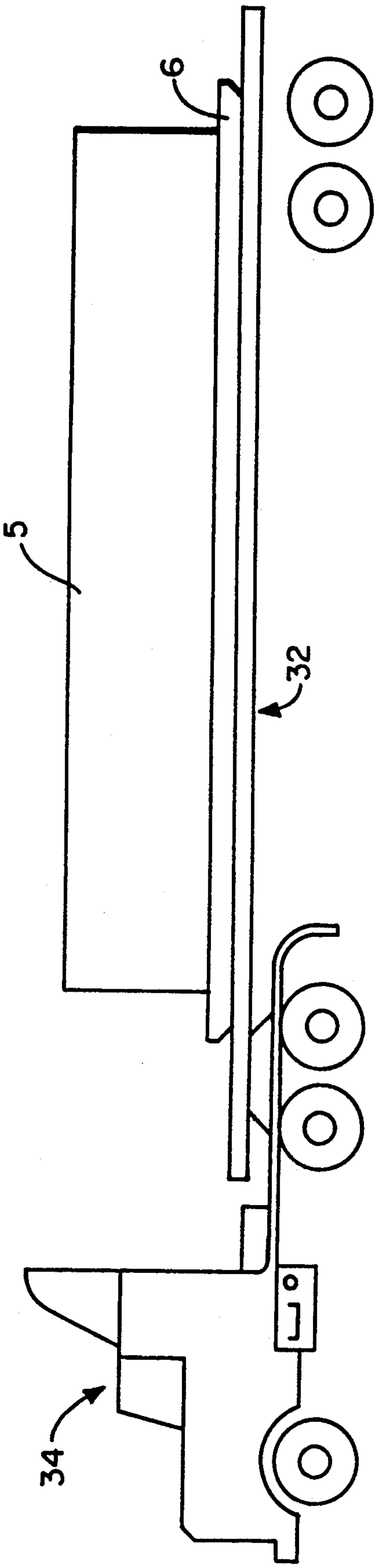
FIG. 2 is a schematic view of the portable refinery of the invention schematically indicated as a rectangular box mounted on a skid, the skid being supported by a trailer and towed by a tractor.

In FIG. 2 is schematically shown portable refinery 5 indicated by the rectangle labeled 5 mounted on skid 6. Skid 6 is mounted on a trailer generally indicated by the numeral 32 connected to a tractor generally indicated by the numeral 34. Thus, portable refinery 5 may be transported to remote locations to refine waste oil or petroleum into diesel fuel. Skid 6 could be transported by railroad car or by boat, barge, or ship if desired.

In one embodiment of the invention, portable refinery 5 could include heater 18, refining vessel 16 and condenser 19, and diesel fuel storage tank 22. However it is preferred that all components disclosed be mounted on skid 6 to constitute portable refinery 5.

Although the preferred embodiments of the invention have been described in detail above, it should be understood that the invention is in no sense limited thereby, and its scope is to be determined by that of the following claims:

What is claimed is:

1. A portable refinery for refining waste oil or petroleum into diesel fuel, said portable refinery comprising:

a. transportable skid means for supporting said portable refinery, said transportable skid means being stationary relative to said portable refinery;

b. waste oil and petroleum reservoir means for holding and storing liquid waste oil and petroleum received from a source external to said transportable skid means, said waste oil and petroleum reservoir means being connected to said transportable skid means;

c. refining vessel means for holding and refining waste oil or petroleum, said refining vessel means being connected to said waste oil and petroleum reservoir means, said refining vessel means having inlet means for receiving liquid waste oil and petroleum, said refining vessel means having a top and a bottom, said refining vessel means having condenser means connected thereto for condensing gaseous hydrocarbons produced by said refining vessel means, said refining vessel means having accumulator means connected thereto for removing and collecting water and other impurities in said liquid waste oil and petroleum which settle to said bottom of said refining vessel means, d. heater means for providing heat to said refining vessel means, said heater means being connected to said refining vessel means;

e. preheater means connected to said transportable skid means for preheating said liquid waste oil and petroleum from said waste oil and petroleum reservoir means prior to said liquid waste oil and petroleum reaching said refining vessel means, said preheater means being connected to said heater means to heat said preheater means, said preheater means having an inlet means for receiving said liquid waste oil and petroleum from said waste oil and petroleum reservoir means and an outlet means for discharging said liquid waste oil and petroleum which has been preheated, said outlet means of said preheater means being connected to said inlet means of said refining vessel means, f. diesel fuel storage tank means for holding and storing diesel fuel, said diesel fuel storage tank means being connected to said refining vessel means, g. dewatering means for removing water from diesel fuel, said dewatering means being connected to receive said liquid waste oil and petroleum from said diesel fuel storage tank means, and remove water from said liquid waste oil and petroleum and convey said water-removed liquid waste oil and petroleum to a diesel reservoir tank means;

h. first pump means connected to said transportable skid means for pumping diesel fuel from said diesel fuel reservoir means to said heater means, said first pump means having inlet means connected to said diesel reservoir tank means and outlet means connected to said heater means;

i. second pump means including a first pump for pumping said waste oil and petroleum from said waste oil and petroleum reservoir means to said inlet means of said preheater means, and a second pump being connected to said preheater means and to said refining vessel means for pumping said preheated waste oil and petroleum from the preheater means to said refining vessel means; and j. level control means connected to said refining vessel means and connected to said second pump means for maintaining the level of liquid waste oil and petroleum in said refining vessel means at a preset level, said level control means activating said second pump means to pump liquid waste oil and petroleum into said refining vessel means when the level of liquid waste oil and petroleum in said refining vessel means is below said preset level to raise the level of liquid waste oil and petroleum in said refining vessel to said preset level.

2. The portable refinery means of claim 1 further comprising oil/water separator means for removing water from oil is connected to said waste oil and petroleum reservoir means, said oil/water separator means having an inlet for receiving waste oil or petroleum from a source external to said skid means and an outlet for discharging oil or petroleum from which water has been removed by said oil water separator means to said waste oil and petroleum reservoir means.

3. The portable refinery means of claim 1 further comprising electrical generating means being connected to said skid means for operating said pump means.

4. The portable refinery of claim 1 wherein said dewatering means comprises filter means.

* * * * *